M. SKOLNIK.
CHILD'S VEHICLE.
APPLICATION FILED DEC. 14, 1918.
1,299,515.
Patented Apr. 8, 1919.
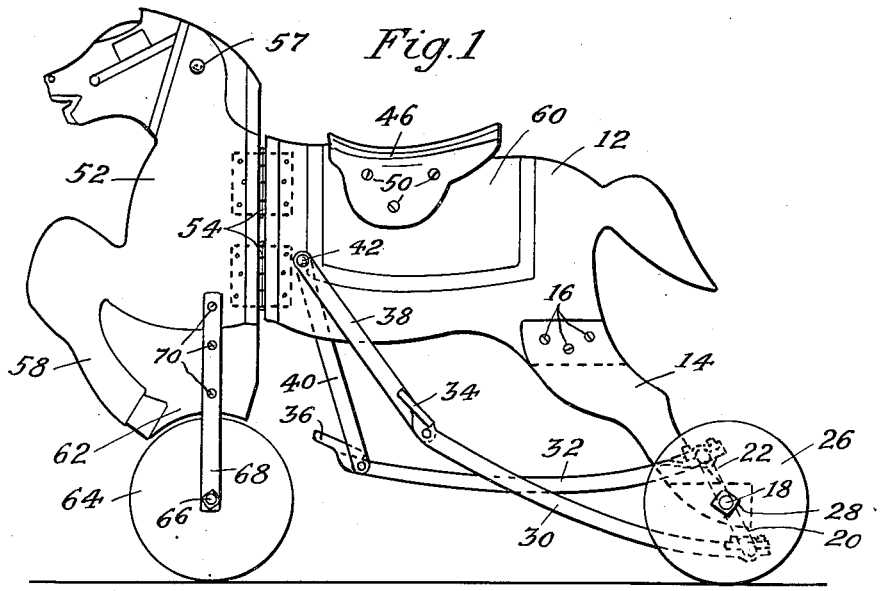
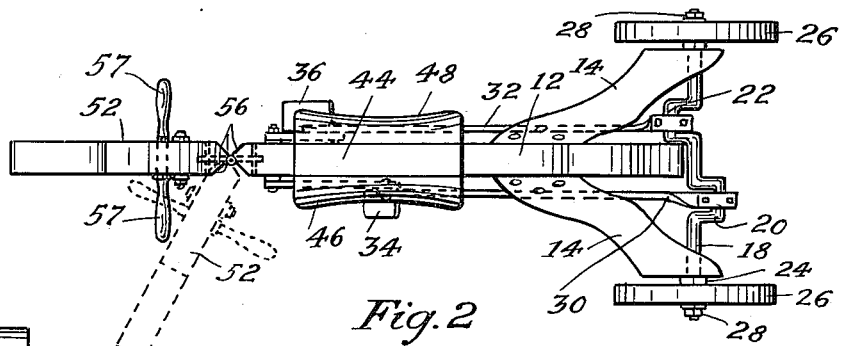
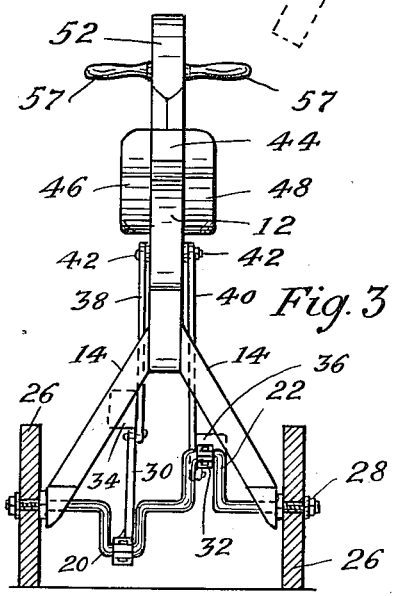
Inventor:
Max Skolnik.
By Whiteley and Ruckman
his Attorneys.

UNITED STATES PATENT OFFICE.

MAX SKOLNIK, OF MINNEAPOLIS, MINNESOTA.

CHILD'S VEHICLE.

1,299,515.

Specification of Letters Patent.  Patented Apr. 8, 1919.

Application filed December 14, 1918. Serial No. 266,683.

*To all whom it may concern:*

Be it known that I, MAX SKOLNIK, a citizen of the United States, residing at Minneapolis, in the county of Hennepin and State of Minnesota, have invented certain new and useful Improvements in Children's Vehicles, of which the following is a specification.

My invention relates to a child's vehicle and the object is to provide a device of this kind which will not only be attractive in appearance and thus appeal to the child, but which may be readily propelled and guided by the child without particular danger of his falling off.

The full objects and advantages of my invention will appear in connection with the detailed description thereof and the novel features embodied in my inventive idea will be particularly pointed out in the claim.

In the drawings,

Figure 1 is a side elevational view. Fig. 2 is a top plan view. Fig. 3 is a rear elevational view with the driving wheels in section.

Referring to the particular construction shown in the drawings a main body member 12 preferably of wood is shaped to simulate a horse or pony, rear diverging leg members 14 being secured to the body member by screws 16. The lower ends of these leg members constitute bearings for a crank shaft 18 having the crank portions 20 and 22 at one hundred eighty degrees from each other. The ends of the crank shaft are screw threaded and the inner portions of the screw threads are provided with nuts or washers 24. Driving wheels 26 having holes through their centers are placed on the ends of the shaft in contact with the nuts 24 while nuts 28 are threaded upon the screw threaded ends of the shaft and are turned down upon the wheels so as to secure the latter firmly in place on the shaft. Operating bars 30 and 32 have their rear ends surrounding the cranks 20 and 22 respectively and the forward ends of these bars are provided with pedals 34 and 36. The lower ends of links 38 and 40 are pivotally attached to the operating bars near the pedals and the upper ends of the links are pivotally attached at 42 to opposite sides of the main body member near its forward end. The top edge of the body member is shaped at 44 to form the central portion of a saddle which is completed by coöperating side portions 46 and 48 secured to the body member by screws 50. The front portion of the vehicle is constituted and supported in the following manner: A member 52 is hinged to the main body member 12 by one or more hinges 54, the opposite sides of each hinge being secured in slots in the two members so that the operative portion of the hinge lies in a vertical median line relatively to the two members. The adjacent ends of the two members are beveled at 56 so that the member 52 may be swung either to the right or the left as desired. The member 52 is provided with a handle 57 extending out from each side for grasping by the hands of the rider. In Fig. 2 the swinging movement in one direction is indicated by dotted lines. The member 52 has painted on its opposite sides a simulation of the two front legs, one of which is indicated at 58 in Fig. 1, and these legs being partly shaped from the material of the member 52. The main body member may have a portion painted to represent a blanket as indicated at 60. The upper portion of the member 52 is shaped and painted to represent the head of a horse or pony and the lower portion of this member is concaved at 62 to correspond with the circumference of a guiding or steering wheel 64. This wheel is mounted on a short shaft 66 supported in the lower ends of two depending bars 68, one for each side and secured by screws 70 to the member 52.

The operation and advantages of my invention will be obvious from the foregoing description. The child when seated on the saddle may readily propel the vehicle by pushing forward on the pedals 34 and 36. His balance on the saddle is maintained by resting the hands upon the handles 57 while by exerting turning movement thereof in the proper direction the vehicle is easily guided.

I claim:

A child's vehicle comprising a main body member shaped to simulate an animal, rear leg members attached to said body member, a crank shaft rotatably mounted in the lower ends of said leg members, driving wheels secured upon the ends of said shaft, a saddle on said body member, links pivoted to said body portion at a place below and in front of said saddle, operating bars pivoted near their front ends to the lower ends of said links and attached at the rear ends to the cranks of said crank shaft, pedals on the front ends of said operating bars, a head and front member hinged to said main body member, a guiding wheel upon which said head and front member is supported, and handles secured to said last mentioned member for swinging the same.

In testimony whereof I hereunto affix my signature.

MAX SKOLNIK.